PORTABLE CORDLESS SWITCHBOARD

Filed July 27, 1961 3 Sheets-Sheet 1

INVENTOR.
THOMAS P. MILLER
ROBERT H. DUNCAN
BY
ATTORNEY

April 6, 1965 T. P. MILLER ETAL 3,177,293

PORTABLE CORDLESS SWITCHBOARD

Filed July 27, 1961 3 Sheets-Sheet 2

April 6, 1965 T. P. MILLER ETAL 3,177,293

PORTABLE CORDLESS SWITCHBOARD

Filed July 27, 1961 3 Sheets-Sheet 3

United States Patent Office 3,177,293

Patented Apr. 6, 1965

3,177,293

PORTABLE CORDLESS SWITCHBOARD

Thomas Paul Miller, Mount Prospect, and Robert H. Duncan, Arlington Heights, Ill., assignors to International Telephone and Telegraph Corporation, New York, N.Y., a corporation of Maryland Filed July 27, 1961, Ser. No. 127,196

9 Claims. (Cl. 179—27)

This invention relates to cordless switchboards and more particularly to cordless switchboards for portable installation.

The usual switchboard has a number of cords for making plug and jack connections between subscriber lines. These cords, however, present problems when convenience and appearance are of primary importance. Therefore, it has been common practice to provide cordless switchboards for special installations when cords are not satisfactory.

These cordless switchboards normally are relatively small devices because the switching is completed via a key matrix. Previous matrices have included one key in every switching link for every subscriber line terminating at the switchboard. Thus, if a switchboard has twenty links for interconnecting fifty lines, a total of one thousand keys are required. In terms of switchboard panel size, this thousand key matrix represents a control board about seventy-five inches long and thirty inches high. In addition, panel space was required for common equipment. Obviously, a board this large would be almost impossible to operate—at least by operators having arms of normal length. Moreover, a thousand keys are extremely expensive.

Additionally, cordless switchboards present many problems if mounted in vehicles for transportation to various locations and/or operation while the vehicles are in motion. First, space and weight are critical factors. Second, vibrations cause relays and other components to fail. Finally, if the switchboards are mounted in airplanes, circuit components must withstand many "G's," rapid changes in altitude, humidity, temperature and the like, and yet must give extremely reliable service. Obviously, the safety factors of airplane operation preclude otherwise normal failures.

Accordingly, an object of this invention is to provide new and improved cordless switchboards, and more particularly to provide such switchboards for portable and/or mobile installations. A more particular object is to provide airborne switchboards capable of withstanding vibrations and severe mechanical shock. Also an object is to provide an extremely small, light switchboard having great switching capacity.

Another object of this invention is to provide extremely reliable communication equipment. Here an object is to provide four-wire switching via lightly loaded relays. In this connection, an object is to avoid use of semiconductors or other components having characteristics which cause failure under adverse ambient environmental conditions. Furthermore, an object is to provide cordless switchboards of modular construction to facilitate repair and replacement of defective parts.

In accordance with one aspect of this invention, a cordless switchboard is provided with a switching module terminating each subscriber line served by that switchboard. Each module includes a stepping switch having wipers connected to individually associated subscriber and/or trunk lines. The corresponding terminals of the switch banks are multipled. Therefore, to interconnect two or more subscriber lines, it is only necessary to operate the switches associated with those lines to seize the same multiple. Operation of a release key associated with common equipment and a line key associated with any one interconnected line releases all switches then connected to that one line.

The above mentioned and other features and objects of this invention and the manner of obtaining them will become more apparent and the invention itself will be best understood by reference to the following description of an embodiment of the invention taken in conjunction with the accompanying drawings, in which.

Figure 1:
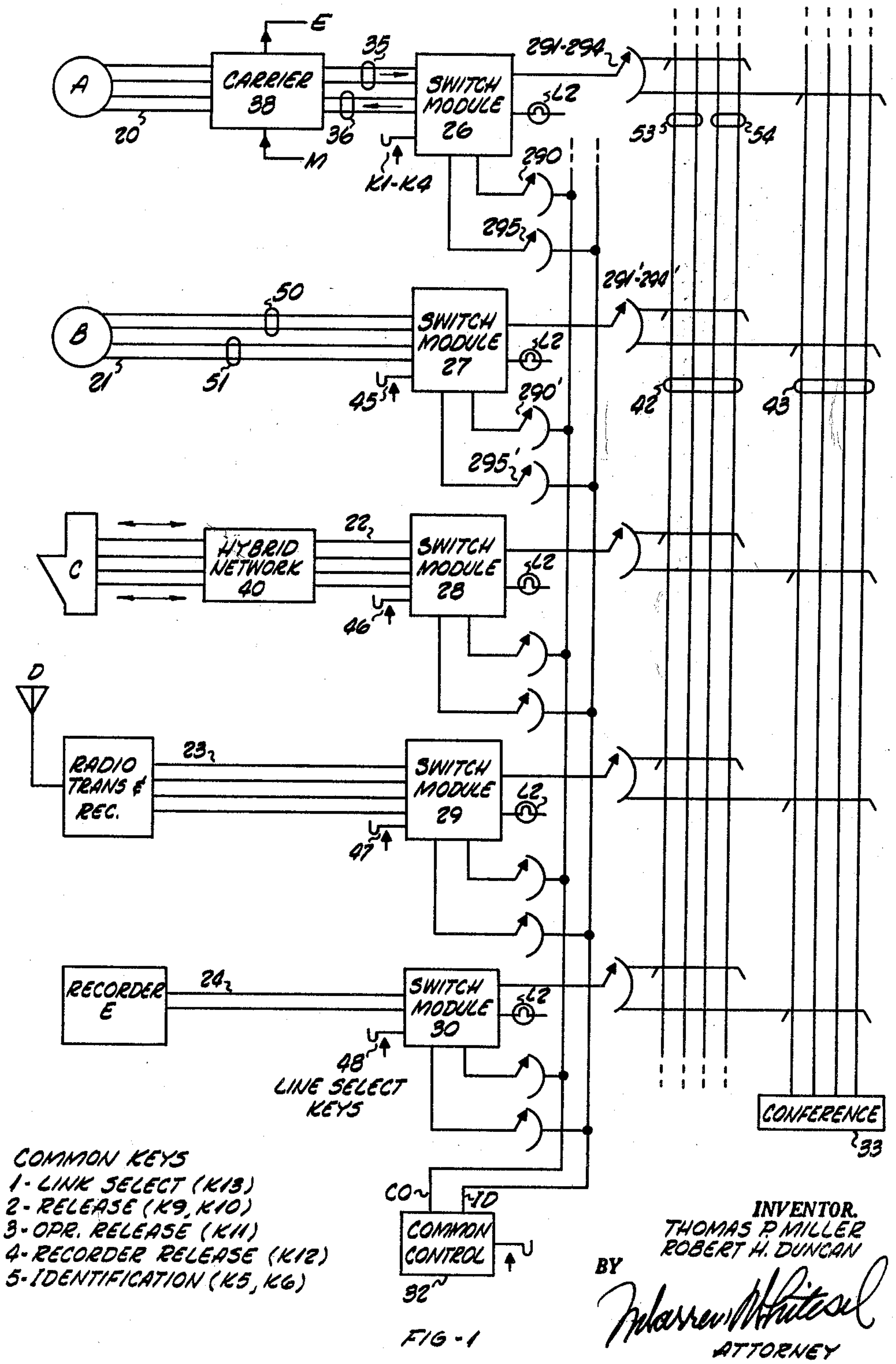
FIG. 1 shows a cordless switchboard by block diagram.

The general principles of the invention are shown in the block diagram of FIG. 1. This diagram includes a number of subscriber and/or trunk lines 20–24, voice signal sources A–E, switching modules 26–30, and common equipment 32–33. These lines are of the four wire variety; although, it should be understood that two wire lines may be used also. Normally one pair of these four wire lines is a transmit channel 35 and the other pair is a receive channel 36. An advantage of four wire lines is that the communication paths tend to be clearer than the two wire variety and to give more reliable service.

The voice signal sources may include any audio-electrical transducing device. To illustrate this fact, these sources are shown as including a carrier terminal 38, a subscriber station B, an operator position C, a radio transmitter-receiver D, and a recorder E. The carrier terminal is descibed as utilizing the well known E and M signaling leads. The operator position C is connected to its associated line 22 via a hybrid network 40 because the operator may have to transmit or receive over either two wire channel as indicated by the double ended arrows depending upon connections in the associated switching module. The recorder E has only two wires because it either records or transmits but does not do both.

Each switching module includes a stepping switch operating in silicone oil and its control relays, each relay having a maximum of two operating contacts. Each switch includes six wipers and banks in one exemplary construction. Here, for the switching of the wires associated with line 20, four banks are shown collectively as a voice channel at 291–294, and the other two banks 290, 295 carry control leads CO, ID. The other lines terminate in the four brushes of the other switches. Corresponding terminals in the banks of all switches which are multipled as shown at 42. Therefore, to interconnect two or more lines, it is only necessary to operate the switches associated with those two or more lines to seize the same common multiple. Common control circuit 32 operates these switches via markings applied to the two control buses CO (cut-off) and ID (identification) and, thus, the switches 290–295.

This common equipment includes relay and key circuitry 32, common voice channel buses 42 and special buses 43 with attached circuitry such as conference amplifier 33, for example. More particularly, these common keys include a link key K13 individual to each of the voice channel buses 42, 43, a single release key K9, K10, an operator release key K11, a recorder release key K12 and an identification key K5, K6. If the link key individual to the voice channel 42 is operated at the same time that the line key K1–K4 is operated, for example, switch module 26 connects the carrier terminal 38 to the voice channel 42. If the same channel 42 link key and line key 45 are operated next, switch module 27 also seizes the voice channel 42. Thus, parties A, B may talk to each other over the path including the line 20, carrier terminal 38, lines 35, 36, switch module 26, voice channel 42, switch module 27, and line 21.

In one exemplary construction, these voice channels were carried over jumper wires connecting multiprong plugs—"patching cords" as they are sometimes called. If the patching cords are open ended, as shown at 42, they serve no useful function beyond providing highways for common voice channels. On the other hand, if the patching cords connect with other modules 38, special purposes are accomplished. Thus, the voice channel 43 is shown as connected to a conference call circuit 33. Other special purpose circuits may be used also.

If the release key K9, K10 and a line key (such as K1–K4) are operated at the same time, all switching modules connected to that one line are released. If the operator release key K11 and the line key 46 are operated at the same time, only the operator switch module 28 is released. If the recorder release key K12 and the line key 48 are operated at the same time, only the recorder switch module 30 is released. When the "ID" or identification key is operated simultaneously with a line key lamps L2 light to identify all lines connected in a common call with the line having an operated line key.

*Brief description*

Figures 2, 4:
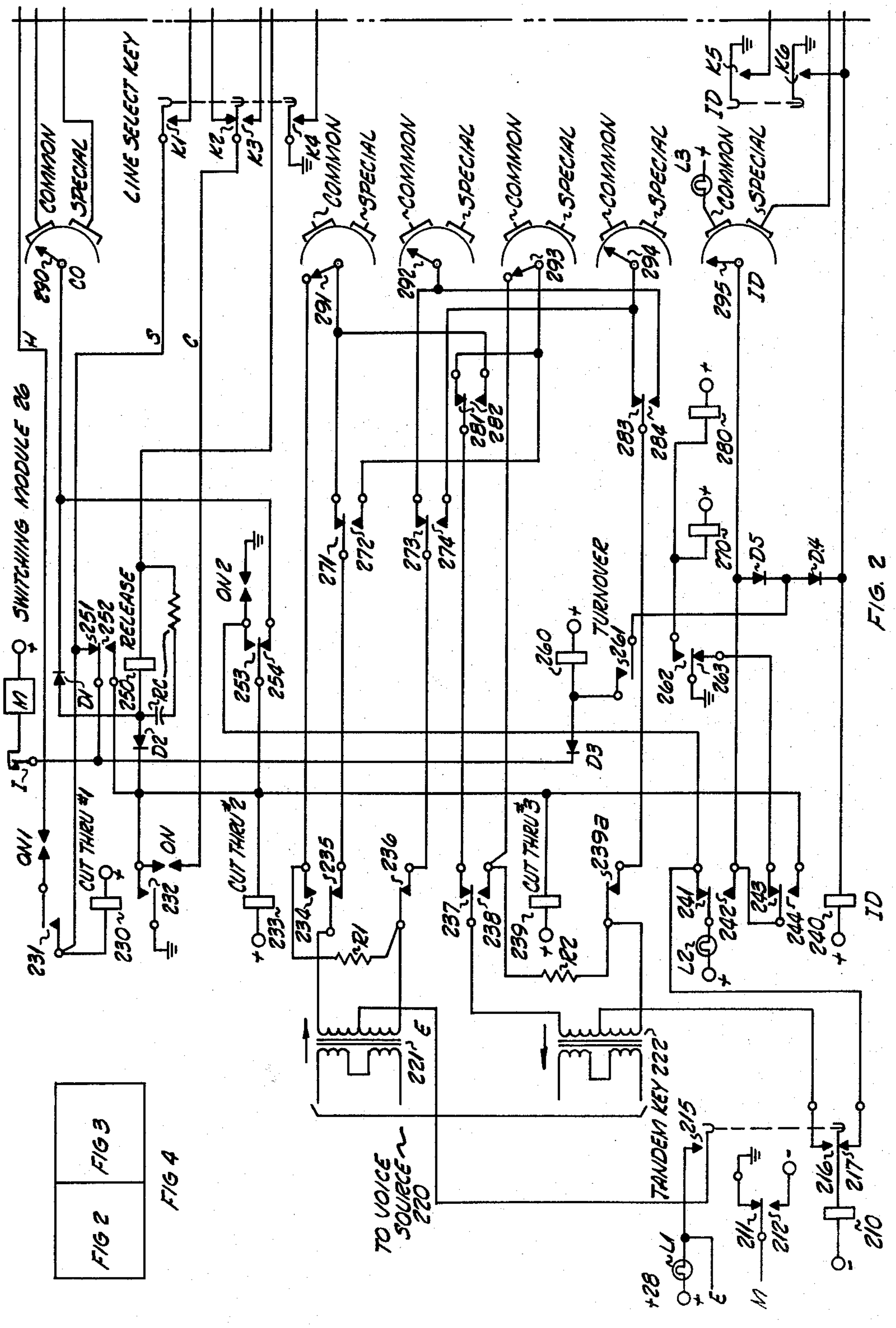
FIGS. 2 and 3 show, by schematic circuit diagram, the circuitry of the cordless switchboard.
FIG. 4 shows the manner in which FIGS. 2 and 3 should be joined to provide a complete circuit.
Figure 3:
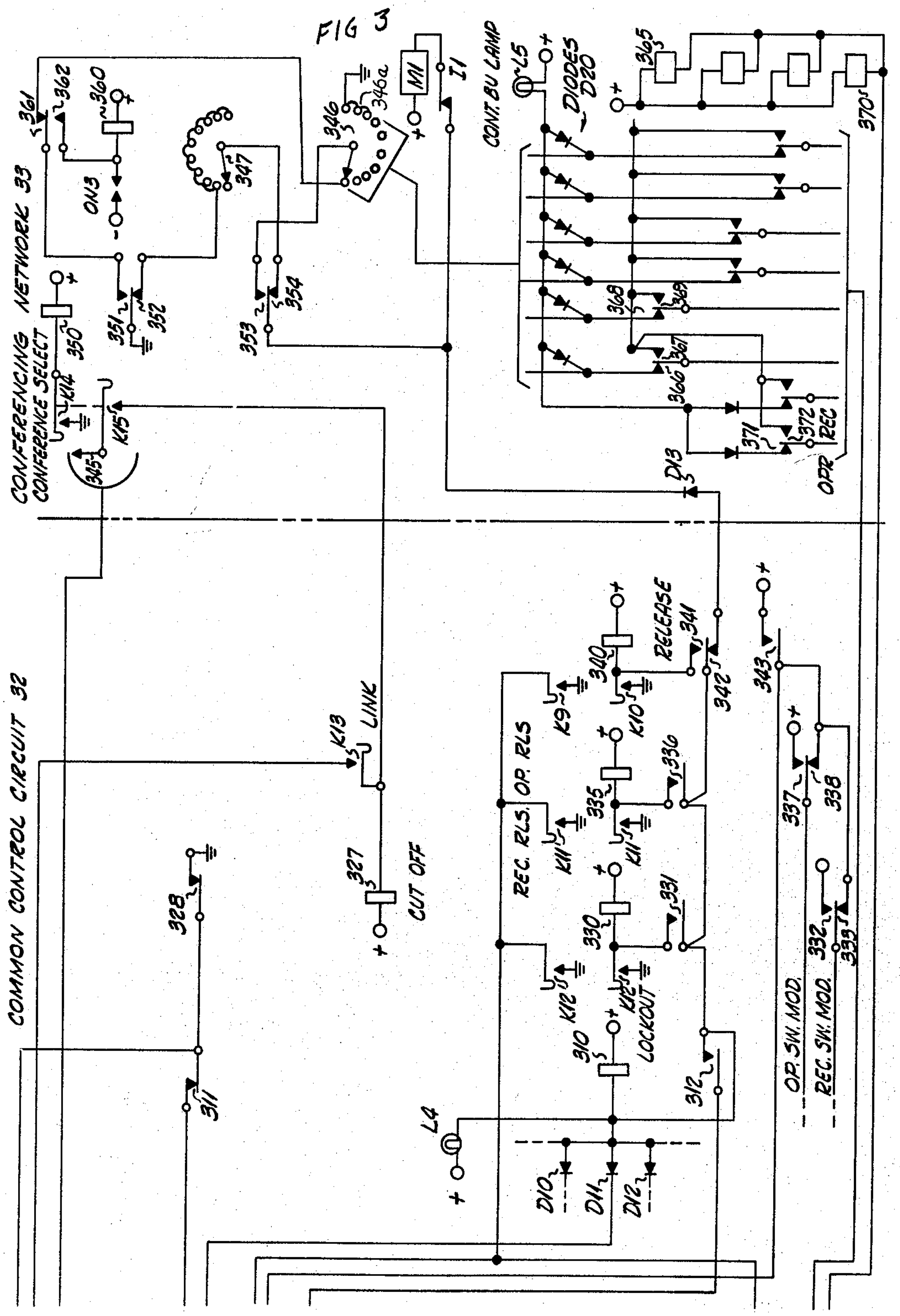

The details of the circuitry required for the hollow blocks of FIG. 1 are shown in FIGS. 2, 3. More particularly, the switching module 26 circuit is shown at the left of a dashed line (FIG. 2). The common control circuit 32 is shown between the dashed lines of FIGS. 2, 3. A special common conferencing network 33 is shown at the right of a dashed line of FIG. 3. The various keys, lamps, and the like, are scattered through these drawings at the most convenient locations; however, as will be apparent to those skilled in the art, the keys and lamps will be physically located at a control panel.

The principal components of this circuit include a pair of stepping switches, preferably operating in silicone oil to prevent operation or release of the switches responsive to mechanical shock or vibrations. The switch of FIG. 2 has about half of its bank terminals connected to common multiples (such as 42, FIG. 1) and the other half connected to special multiples (such as 43, FIG. 1). None of the relays has more than two "C" combination contact springs. This light contact loading also allows the relays to function properly despite vibration and shock.

It is thought that the remaining components will be understood best from the following description of circuit operation.

*Calling condition.*—When a calling party goes off-hook a circuit is completed from a voice signal source 220 to repeat coils 221, 222. The coils 221 are in the transmit channel, and the coils 222 are in the receive channel. A line lamp (not shown) lights, and, in response thereto, an associated line select key K1–K4 is operated by an operator or keyboard attendant.

Responsive to the closure of key K1, cut-thru #1 relay 230 operates over the circuit from (+) battery through the winding of relay 230, key K1, contacts 311, and 328 to ground. Ground is applied at contacts 232 without immediate effect on relay 250 because diode D2 is back biased. However, the ground does operate relays 233, 239 over obvious circuits. These relays are slaves of relay 230 to avoid heavy contact loading.

Contacts K2–K4 have no immediate effect.

Next the operator selects a link key K13 (FIG. 3) associated with an idle link—this may be the voice channel 42 of FIG. 1. The operator knows the link is idle because the associated link lamp L3 is dark. A circuit is completed from (+) battery through the winding of relay 327, key K13, and the bank terminal of switch wiper 290 individually associated with the selected link.

The motor magnet M operates over the circuit traced from (+) battery through the magnet winding, interrupter contacts I, contacts 251, key K1, contacts 311 and 328 to ground. Interrupter contacts I open to release magnet M and wipers 290–295 advance one step. Each of the off-normal contacts (ON) of FIG. 2 operate. If wiper 290 does not find (+) battery, magnet M reoperates when interrupter contacts I close, the reoperate circuit including (+) battery, magnet M winding, interrupter contacts I, contacts 251, 231, off-normal contacts ON1, and contacts 328 to ground. Again interrupter contacts I open and close while wipers 290–295 advance another step.

Lamp L2 lights via contacts 241 and ON2 to identify the calling line to the operator. Relay 210 operates through contacts 217 and repeats M conductor supervisory signals at contacts 211, 212.

Means are provided for precluding the simultaneous extention of two or more calls through the switchboard, thus avoiding interconnection of independent calls. This means is found in the common control circuit 32. Specifically, line key contacts K1 close a circuit through contacts 311 to advance the switch of FIG. 2 off its home position. The off-normal contacts ON1 close an alternate stepping circuit so that the line key may be released at once, and the switch will continue to step from ground at contacts 328. Also, the off-normal contacts ON close so that when the line key is released, a lock out relay 310 operates over the circuit from (+) battery through the relay 310 winding diode D11, contacts K2, ON 232 to ground. Lamp L4 lights over a circuit in parallel with the relay 310 winding to indicate that switch operation is in progress and that another call cannot be served. However, if the operator ignores the lamp L4 and pushes another line key, contacts K1 of that other line key close without effect because relay 310 holds contacts 311 open.

To stop the stepping switch on the bank terminal marked by the link key K13, cut off relay 327 operates over a circuit from (+) battery through the relay 327 winding, key K13, bank and wiper 290, contacts 254, and contacts 232 to ground. Relay 327 opens contacts 328, removes the motor magnet M ground and releases relay 230. Switch motion terminates and link lamp L3 lights over the ID bank to show that the link is busy. The lamp circuit extends from (+) battery through lamp L3, bank and wiper 295, contacts 243, and 263 to ground. Diodes D4 and D5 do not conduct lamp battery current. Cut thru #2 relay 233 and #3 relay 239 operated over the circuit traced from (+) battery through these relay windings in parallel and contacts 232 to ground. These relays opened the talking circuits at contacts 235, 236, 237, 239*a* to prevent the calling subscriber from hearing noise or bits of other conversations while wipers 291–294 step over bank terminals. Resistors R1, R2 terminate coils 221, 222 to prevent line unbalance. Now, after contacts 328 open to release relay 230, contacts 232 open to release relays 233, 239, and 310. This release of relays 233, 239 in turn closes contacts 235, 236, 237, 239*a* to connect the voice signal source 220 to wipers 291–294. The terminating resistors R1, R2 are removed when contacts 234, 238 open. Contacts 311 close when relay 310 releases thus preparing a circuit to operate the next switch module.

The talking circuit is now completed through wipers 291–294 to a common channel 42 (FIG. 1) depending upon which of a number of link keys K13 is operated.

The operator connects the switchboard (FIG. 1) with the same link by simultaneously operating the link key K13 (FIG. 3) and the line key 46 (FIG. 1). This, in turn, causes the switching module 28 to seize the link identified by key K13 in the above described manner. Thereafter, the calling party identifies the called party to the operator. Then the operator then operates the link key K13 and the line key 45 (FIG. 1) simultaneously to cause the switching module 27 to seize the common link or voice channel 42.

*Called condition.*—Means are provided for "turning over" the transmit and receive channels of the called subscriber lines. More particularly, the party A transmitter normally connects with the two wire line 35, and the receiver with the two wire line 36. Similarly, the party B transmitter and receiver connect with the two wire lines 50, 51, respectively. Thus, if both switch modules 26, 27 operate in the same manner, all transmitters are connected together and all receivers are connected together. Obviously, this is not good because the voice signals will not mix. The party A transmitter should be connected with the party B receiver and vice versa. To accomplish this the switch module 27 of the called line turns over the transmit and receive channel of that line, i.e., connects the line 21 receive channel 51 to the link transmit channel and the line 21 transmit channel 50 to the link receive channel. In this way parties A and B can hear each other. The operator C can hear either party because the hybrid network 40 gives the operator two way conversation over both of the two wire lines 50, 51.

Before explaining this feature of the invention in detail, it may be well to point out that lines normally terminate in finder and connector circuits or front and rear cord circuits. Thus, the turn over normally occurs between these two terminating circuits. This, on the other hand, requires some duplication which is acceptable and even desirable in the usual switchboard. However, the bulk and weight of such duplication is undesirable in mobile installations. Therefore, one "universal" line switch performs both finder and connector functions.

The turn over circuitry shown here includes relays 260, 270, 280 (FIG. 2). Each time that the operator pushes a line key, a circuit is completed for operating the turn over relay 260, as follows: Ground, contacts 328, 311, key K1, contacts 251, diode D3, and the winding of relay 260 to (+) battery. If key K1 is operated to seize a calling line, relay 260 closes its contacts 261 and extends a circuit through OR gate diode D5, and contacts 243 to open contacts 263. When the operator releases key K1, relay 260 releases to close contacts 263 too late to hold relay 260. It should be noted that ID wiper 295 rests on the link seized by the calling line switching module 26; therefore, wiper 295 is now grounded through contacts 263, and 243. If a similar key K1 is operated to seize a called line (for example key 45, FIG. 1 is operated), turn over relay 260 operates and closes its locking contacts 261. A hold circuit extends from (+) battery through the relay 260 winding (module 27) contacts 261, diode D5, wiper 295, and the ID conductor to ground on wiper 295 of the calling line switching module 26.

From the foregoing it is seen that the turn over relay 260 holds operated only in the switching module of the called line. Therefore, the calling line switching module 26 acts as a finder, and the transmit voice channel extends from repeat coil 221 through contacts 235, 236, and 271, 273, wipers 291, 292, and associated banks to link transmit channel 53, FIG. 1. The calling line receive channel extends from repeat coil 222 (FIG. 2) through contacts 237, 239*a*, and 281, 283, wipers 293, 294, and associated banks to link receive channel 54 of FIG. 1. The called line switching module 27 acts as a connector and the turnover relay 260 operates relays 270, 280 via contacts 262. Therefore, the called line transmit channel extends from repeat coil 221 through contacts 235, 236, and 272, 274, wipers 293 and 294, and associated banks to the link receive channel 54, FIG. 1. The called line receive channel extends from repeat coil 222 through contacts 237, 239*a*, and 282, 284, wipers 291, 292, and associated banks to the link transmit channel 53, FIG. 1.

Thus far a call has been described between parties A and B. To complete the call connection, the switch modules 26, 27, and 28 have operated to seize the same common voice channel link 42. Assuming that the operator has no further interest in the call, it is now necessary to release the switch module 28, without disturbing the modules 26, 27.

*Release*.—Means are provided for releasing the operator without disturbing the call connection. To accomplish this end, key K11 is operated to pull relay 335 and the line key 46 in the operator module is pushed momentarily. The contacts 337 (FIG. 3) close a circuit individual to the operators module 28 which extends (+) battery through a winding of a release relay in module 28, corresponding to relay 250 and a resistor-capacitor network RC. The line key closes a circuit traced from the relay 250 winding and RC network through diode D2, off normal contacts ON, conductor C, contacts K3 and K11' to ground. The operator module relay 250 operates after the capacitor of the RC network charges and closes contacts 252 for stepping the switch home. Contacts 253 close for locking relay 250 at off-normal ground ON2 until the switch reaches its home position. The stepping ground extends from (+) battery through magnet winding M, interrupter contacts I, contacts 252, off-normal contacts ON, contacts K2 or K3, to ground on contacts K11' or on contacts 336, K11 depending upon whether the line select key has or has not been released. At the home position, off-normal contacts ON open the stepping ground circuit to terminate switch motion. Off-normal contacts ON2 open to release relay 250. Key K11 is released to restore relay 335.

The operator serves other calls while parties A and B converse. Line busy lamp L2 glows in each operated switch module over the circuit from (+) battery through the lamp and contacts 241, and ON2 to ground.

When the parties finish their conversation, they hang up and their line lamps (not shown) light. The operator observes these lamps and momentarily pushes the release key K9, K10 and the line select key of any one line that was participating in the terminated call. It is not necessary to push similar line select keys in each line switch module.

Means are provided for releasing all lines connected to the link serving a now terminated call. This means includes the resistor-capacitor network RC. In greater detail, operation of key contacts K10 pulls relay 340. Relay 340 closes contacts 343 and applies (+) battery to the right hand winding of the release relay 250 and the RC network in every switching module of the system. Contacts K9 apply ground potential through line key K3 of the one module where the line select key is operated. This potential is applied through off-normal contacts ON and diode D2 to the left hand winding of the release relay 250 and the RC network. While the RC capacitor charges, relay 250 is effectively short circuited, and ground is forewarded to all switch modules connected to the link that served the terminated call, as follows: ground, keys K9, K3, off-normal contacts ON, contacts 254, wiper 290, the CO bank multiple and all wipers 290 connected to that multiple, diode D1 of all connected modules, and the left hand ends of the windings of each relay 250 and the RC networks. Since the right hand ends all these relay windings and RC networks connect to (+) battery at contacts 343, each capacitor charges. When the capacitors are charged, they become a D.C. open. When the line select key is released, the release relay 250 operates, contacts 254 open, and all capacitors connected through wiper 290 discharge through their associated windings to operate the release relays. Each completes its locking circuit at its contacts 253.

All switches return home under control of the off-normal contacts ON. On the home position, the voice channel is terminated to prevent line unbalance—One circuit being traced from coil 221, through resistor R1, wiper 291, contacts 271 and 235 to coil 221, and the other circuit being traced from coil 222, through resistor R2, wiper 293 and contacts 281, and 237 to coil 222.

*Recorder*

Occasionally special devices are required during calls. For example, parties may wish to have their conversations recorded. Thus, upon request, the operator pushes key 48 and the link key of the common voice channel serving the requesting parties. This operates module 30 to connect recorder E to voice channel 42. When the recorder is no longer needed, the line key 48 and recorder release key K12, K12' are pushed simultaneously. The effect is the same as the above described operation of key K11, K11' except the module 30 releases.

*Conference calls*

The usual call between two parties is completed via voice channels which are nothing more than open ended common buses as shown at 42 (FIG. 1). Other calls may require special equipment. For example, conference calls require amplifiers for boosting and mixing voice signals to make up the bridging loss caused by each line added to a conference call. These amplifiers are connected to an end of the common buses on special steps on the stepping switches, as shown at 43 (FIG. 1).

As those familiar with conference call circuits know, success depends upon maintaining balanced bridges. Therefore, each line connected into the conference bridge must be inserted in a programmed order. This programming is provided by the "Conference Network" of FIG. 3.

In greater detail, a conference call differs from other calls because each conference line appears as a calling line on its own link. Other calls have all lines connected to one common link. It might be noted that since all conferenced lines appear as calling lines, there is no need for turning over a line. Moreover, by programming the order in which conference links are assigned to conference lines, the order of line insertion is also programmed.

The conferencing network operates in the following manner. A calling line is answered as explained above and the operator learns that a conference call is required. Thereafter, the operator presses the line select key of the calling line and a locking conference select key K14, K15. The line select key operates cut through relays 230, 233, 239 to start the switch of FIG. 2. Contacts K14 operate relay 350.

When relay 350 operates, motor magnet M1 operates over the following circuit: (+) battery, the motor magnet winding M1, interrupter contacts I1, contacts 353, wiper 346 and associated home terminal, contacts 361, and 351 to ground. When interrupter contacts I1 open, magnet M1 releases. When wiper 346 steps off its home terminal the above traced circuit to the motor magnet M1 is broken.

Relay 310 is connected in parallel with motor magnet M1 via contacts 342 and diode D13. Therefore, relay 310 operates to open contacts 311 and prevent further response to other line keys as long as its locking circuit is closed at contacts 312, K4. It should be noted that a calling line has been answered, and that relay 230 operated; therefore, contacts 311 are bypassed at closed off-normal contacts ON1.

The wiper 345 is standing on its first terminal, thus marking a first special terminal in CO bank 290. When that terminal is found the switch of the calling party's module stops. The calling line is now connected to the first point of access in the conference bridge.

When the switch of FIG. 3 steps off-normal its contacts ON3 close to operate relay 360. Contacts 361 open the original stepping circuit, and contacts 362 close a locking circuit for relay 360.

Means are provided for inserting the second conferenced line into the conference bridge in the programmed order. More particularly, when the switch of FIG. 2 comes to rest, a circuit is completed to operate the motor magnet M1. This circuit extends from (+) battery through motor maget M1, interrupter contacts I1, contacts 353, wiper 346, contacts 366, and ID bank and wiper 295, contacts 243, and 263 to ground. The brushes 245–257 advance one step.

If the operator pushes a second line key before releasing the first line key, there is no effect because contacts 311 are open. On the other hand, if the operator releases the first line key, relay 310 restores when contacts K4 open. This in turn closes contacts 311.

To bring in the second party to the conference call, the operator momentarily operates a second line key to cause that switching module to step off-normal and search for the marking applied to the CT bank from the bank 345 step 2. When such marking is found, the motor magnet M stops and the motor magnet M1 reoperates over the ID bank. In a similar manner, every other conferenced line is added to the bridge in the programmed order by wiper 345.

After the last line is conferenced, the conference select key K14, K15 is returned to normal. Relay 350 releases; contacts 352 close to apply ground to the bank terminals of wipers 347. Then contacts 351 open the original stepping circuit to motor magnet M1, after which relay 360 falls to prepare for the next conferencing network switch operation. Thereafter, ground on every terminal of wiper 347 operates motor magnet M1 until the ungrounded home position is found and switch motion stops.

The conference busy lamp L5 lights through diodes D20, contacts such as 366, the ID bank and wiper 295, contacts 243, and 263 to ground.

If all six points of access of the conference circuit are filled, wiper 346 encounters terminals 346*a* strapped to ground. Thus, a circuit is completed through contacts 353 for motor magnet M1. This operates magnet M1 to drive the switch home.

If the operator wishes to release any conferenced party, it is necessary to operate the line key of that line and the release key. Each conferenced line CO wiper 290 connects to a different CO terminal. Therefore, there is no path through the wiper 290 to other switch modules.

To add parties to the conference, the conference select key K14, K15 is operated and a line key is momentarily pushed. The switch of FIG. 3 steps over every terminal in bank 346 marked from the ID bank, thus selecting the first available point of access to the conference circuit.

*Identification*

To identify the parties engaged in a call, the common ID key is operated simultaneously with a line key of one of the parties. Key K6 applies ground through an OR gate diode D4 to hold the turnover relay 260, if operated. Key K6 also operates all ID relays 240 in all switch modules in an obvious way. The contacts 241 open to extinguish all L2 lamps and contacts 242, 244 close to prepare a new circuit to all L2 lamps. Ground from key K5 is applied through contacts K3 of the operated line key, off-normal contacts ON, contacts 244, 242 and the filament of lamp L2 to (+) battery. In addition, the ground on contacts 242 is applied through ID wiper 295 to the ID bank of every connected switch module. There the circuit continues through an associated wiper 295, and contacts 242 to lamp L2. Thus, all L2 lamps go out except those in the switch modules connected to the line having an operated line key.

For conference call, operation of key K6 pulls four relays, two of which are numbered 365, 370. These relays interconnect all of the ID leads in the conference circuit. Again, one relay could do the job but each of the relays is limited to two working contacts. This causes the L2 lamps of all conferenced lines to light. For example, one L2 lamp lights over the circuit traced from ground through the contacts K5, K3 of an operated line key, contacts ON, 244, wiper 295 in one module, contacts 367, 369, a wiper 295 in another switch module, and the filament of an L2 lamp in that module to (+) battery. Hence, the L2 lamps of all conferenced lines light.

*E and M signaling*

As those skilled in the art know, E and M signaling is used in carrier equipment. Normally these conductors connect to local equipment which receives and transmits E and M signals. Relay 210 responds to lamp L2 signals to transmit similar signals when contacts 217 are closed.

If, however, the tandem key is thrown to an operate position, the incoming and outgoing signal paths are effectively interconnected. Thus, the incoming E lead connects through the secondary of repeat coil 221 to the incoming or receive voice channel, wipers 291, 292, the common link 42, and through another switch module and outgoing or transmit voice channel to repeat coil 222. There the M lead connects through contacts 216 to relay 210. Thus, any incoming signals appearing on the E lead are repeated directly to the outgoing M lead if key contacts 215–217 are operated.

It is to be understood that the foregoing description of a specific example of the invention is not to be considered as a limitation on its scope.

We claim:

1. A cordless switchboard comprising a plurality of subscriber lines and line switch modules, each line being terminated by an individual line switch module, a plurality of link circuits, means controlled from said switchboard for operating selected ones of said modules to seize a common link thereby interconnecting the lines connected to said selected modules, means responsive jointly to circuit operations associated with any one of said selected modules and said common link for releasing all said selected modules, means including a transmit and a receive channel in each of said lines, and means for connecting the transmit and receive channels associated with at least one of said selected modules with the receive and transmit channels respectively of the other of said selected modules, whereby said modules provide selective finder and connector functions.

2. A cordless switchboard comprising a plurality of subscriber lines and line switch modules, each line being terminated by an individual line switch module, a plurality of link circuits, means controlled from said switchboard for operating selected ones of said modules to seize a common link thereby interconnecting the lines connected to said selected modules, means responsive jointly to circuit operations associated with any one of said selected modules and said common link for releasing all said selected modules, an operator position connected to one of said lines, at least one of said selected modules being connected to a line leading to said operator position, and means for releasing the module connected to the line leading to said operator position without releasing the other of said selected modules.

3. A cordless switchboard comprising a plurality of subscriber lines and multi-bank line switch modules, each line being terminated at said switchboard by an associated module, a common conference circuit, means associated with said conference circuit for programming the order of insertion of said lines into said conference circuit, means for sequentially operating selected ones of said modules to seize said conference circuit through individual points of access in said programmed order, and means comprising one of said banks on each of said module for identifying all lines connected to said conference circuit.

4. The cordless switchboard of claim 3 and means for selectively releasing any of said lines connected to said conference circuit without disturbing the remaining lines connected to said conference circuit.

5. The cordless switchboard of claim 4 and means for reoperating said programming means for inserting a new line in said conference circuit.

6. A cordless switchboard comprising a plurality of subscriber lines, a plurality of voice signal sources, each source terminating one end of an associated one of the subscriber lines, a plurality of identical switching modules, each module being coupled to the other end of an associated one of said subscriber lines, a line select key individual to each of said switching modules, a plurality of common voice channels including buses multiplied through all of said switching modules, a plurality of link select keys, each link key being individual to particular ones of said voice channels, means responsive jointly to the operation of a link select key and a line select key for causing the switching module associated with said operated line select key to seize the common voice channel associated with said operated link select key, a release key common to all said switching modules, and means responsive jointly to the operation of one line select key and said release key for releasing all switching modules then connected to the common voice channel to which the line associated with said one line select key is connected.

7. A switching network comprising a plurality of subscriber lines each including a transmit and a receive channel, a plurality of switch modules for respective ones of said lines, each of said modules having a plurality of voice path wipers and a pair of control wipers, means responsive to markings selectively applied to the bank associated with one of said control wipers for driving said module switch to a predetermined position, means for feeding a signal through the other of said control wipers on said predetermined position, and means responsive to said signal for connecting the transmit and receive channels of said one module switch to the receive and transmit channels respectively of all of said other module switches thereafter connected to said predetermined position responsive to said marking.

8. A telephone switching network comprising a plurality of subscriber lines, a plurality of universal switch modules for interchangeably and selectively providing finder and connector functions, each of said lines terminating in an individually corresponding one of said switch modules and each having a transmit and a receive channel, means responsive to the receipt of incoming calls over said lines for causing the switch modules terminating said incoming call lines to function as finders, and means responsive to outgoing calls over said lines for causing the switch modules terminating said outgoing call lines to function as connectors.

9. The switching network of claim 8 wherein said last named means comprises means for connecting the transmit and receive channels of said incoming call lines to the receive and transmit channels, respectively of the outgoing call lines in the switch modules.

References Cited by the Examiner

UNITED STATES PATENTS

| | | | |
|---|---|---|---|
| 2,790,853 | 4/57 | Weston | 179—27 |
| 2,852,612 | 9/58 | Baker et al. | 179—18 |
| 2,993,095 | 7/61 | Arnold et al. | 179—27 |

ROBERT H. ROSE, *Primary Examiner.*

WALTER L. LYNDE, *Examiner.*